United States Patent

[11] 3,545,765

[72] Inventor Marcel Jules Helene Staar
479, avenue Louise, Brussels, Belgium

[21] Appl. No. 715,406
[22] Filed March 22, 1968
[45] Patented Dec. 8, 1970
[32] Priority March 22, 1967
[33] Belgium
[31] No. 695,955

[54] DEVICE FOR ENABLING THE DRIVING SPEED OF MAGNETIC TAPE TO BE INCREASED MOMENTS IN RECORDING AND PLAYBACK APPARATUSES
8 Claims, 7 Drawing Figs.

[52] U.S. Cl. .......... 274/4
[51] Int. Cl. .......... G11b 15/44
[50] Field of Search .......... 274/4, 11; 242/(Inquired); 226/49—51, 188; 179/100.2

[56] References Cited

UNITED STATES PATENTS 2,819,350 1/1958 Steinegger .......... 274/4(D)UX
3,085,758 4/1963 Herrmann et al. .......... 226/51X

FOREIGN PATENTS 1,122,277 1/1962 Germany .......... 274/4(D)UX

*Primary Examiner*—Harry N. Haroian
*Attorney*—Waters, Roditi, Schwartz, & Nissen ABSTRACT: A magnetic tape recording and playback apparatus includes a capstan to engage a magnetic tape, a flywheel coaxial with the capstan and a one-way clutch between the capstan and the flywheel. The flywheel is driven by a belt connected to a motor and it normally drives the capstan through the clutch. The capstan can be driven at a higher speed than the flywheel, causing the clutch to disengage, by means of a stepped pulley which can be moved so that one step engages the belt around the edge of the flywheel and another step engages a driving wheel fixed to the capstan.

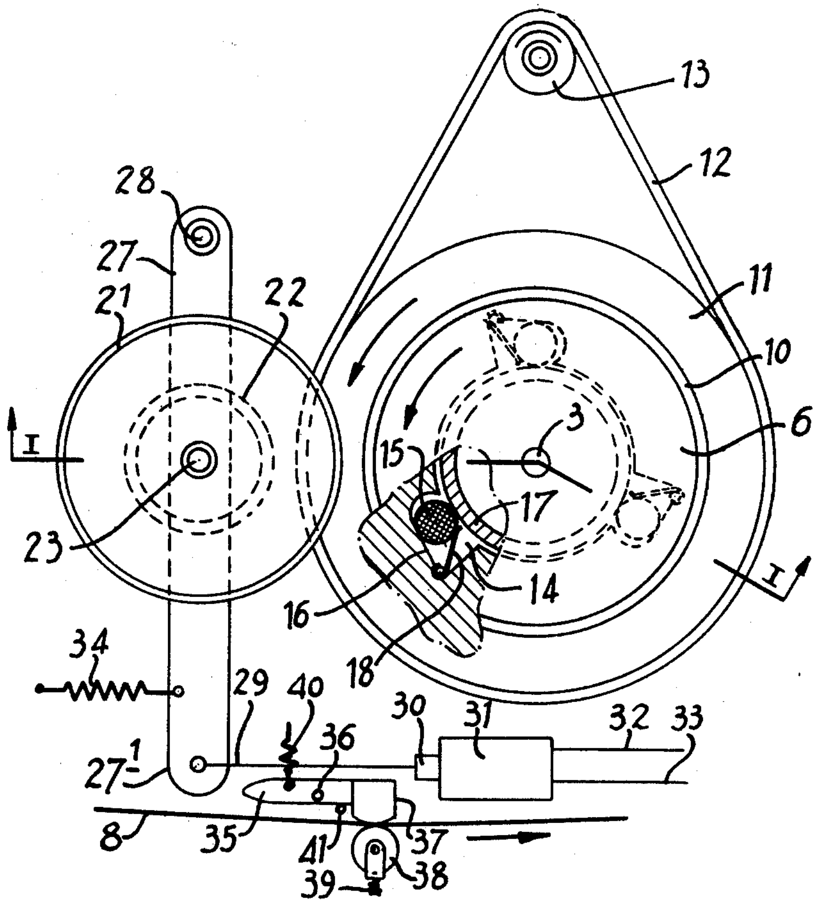

DEVICE FOR ENABLING THE DRIVING SPEED OF MAGNETIC TAPE TO BE INCREASED MOMENTS IN RECORDING AND PLAYBACK APPARATUSES

The invention relates to magnetic tape recording and playback apparatus. In such apparatus it is necessary that the rate of passage of the tape past recording or playback heads can be increased rapidly between periods of normal recording or playback to allow rapid access to any part of the tape. To permit rapid acceleration of the tape the capstan which drives the tape must have as small a moment of inertia of possible.

It is also desirable during normal recording or playback that the capstan which drives the tape should have associated therewith a large moment of inertia so that unintended fluctuations in the drive speed of the capstan are minimized.

It is an object of the present invention to provide a magnetic recording and playback apparatus in which the above two requirements are satisfied.

According to the invention, I provide a magnetic recording and playback apparatus comprising:

A supporting frame, a capstan rotatably mounted in the frame for engaging a magnetic tape and driving the same through the apparatus, first driving means connectable to and disconnectable from the capstan for driving the capstan at high speed, a flywheel mounted in the frame for rotation about the same axis as the capstan, second driving means for driving the flywheel at a relatively low speed, clutch means between the capstan and the flywheel to connect the capstan with the flywheel when said first driving means is disconnected from the capstan and to disconnect the flywheel from the capstan when said first driving means is connected to the capstan.

The invention will now be described with reference to the accompanying drawings, wherein:

FIG. 2 is a view of a detail;

Figures 1, 2, 3:
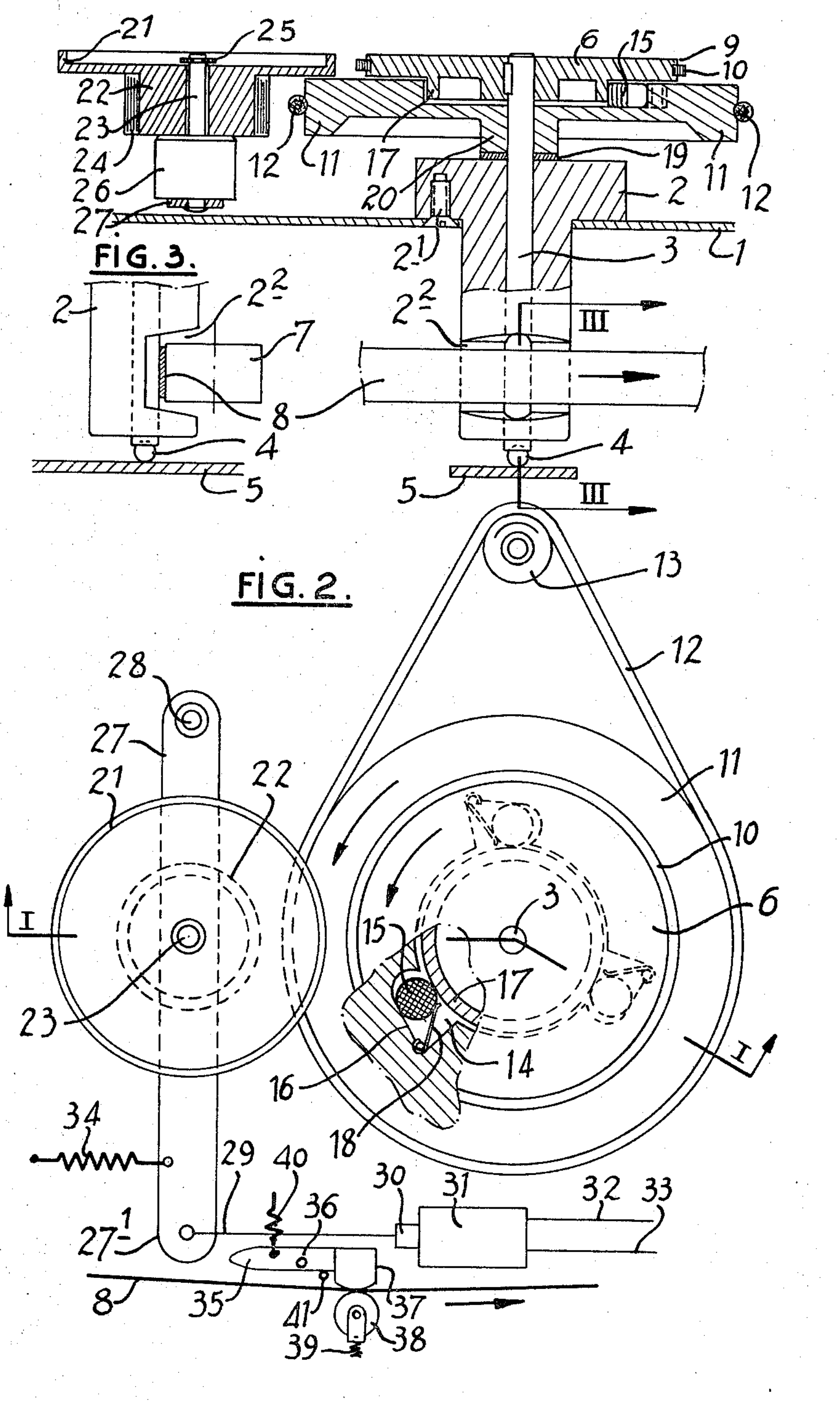
FIG. 1 is a vertical section through part of a magnetic tape recording and playback apparatus during recording or playback.
FIG. 2 is a plan view corresponding to FIG. 1.
Figures 4, 5:
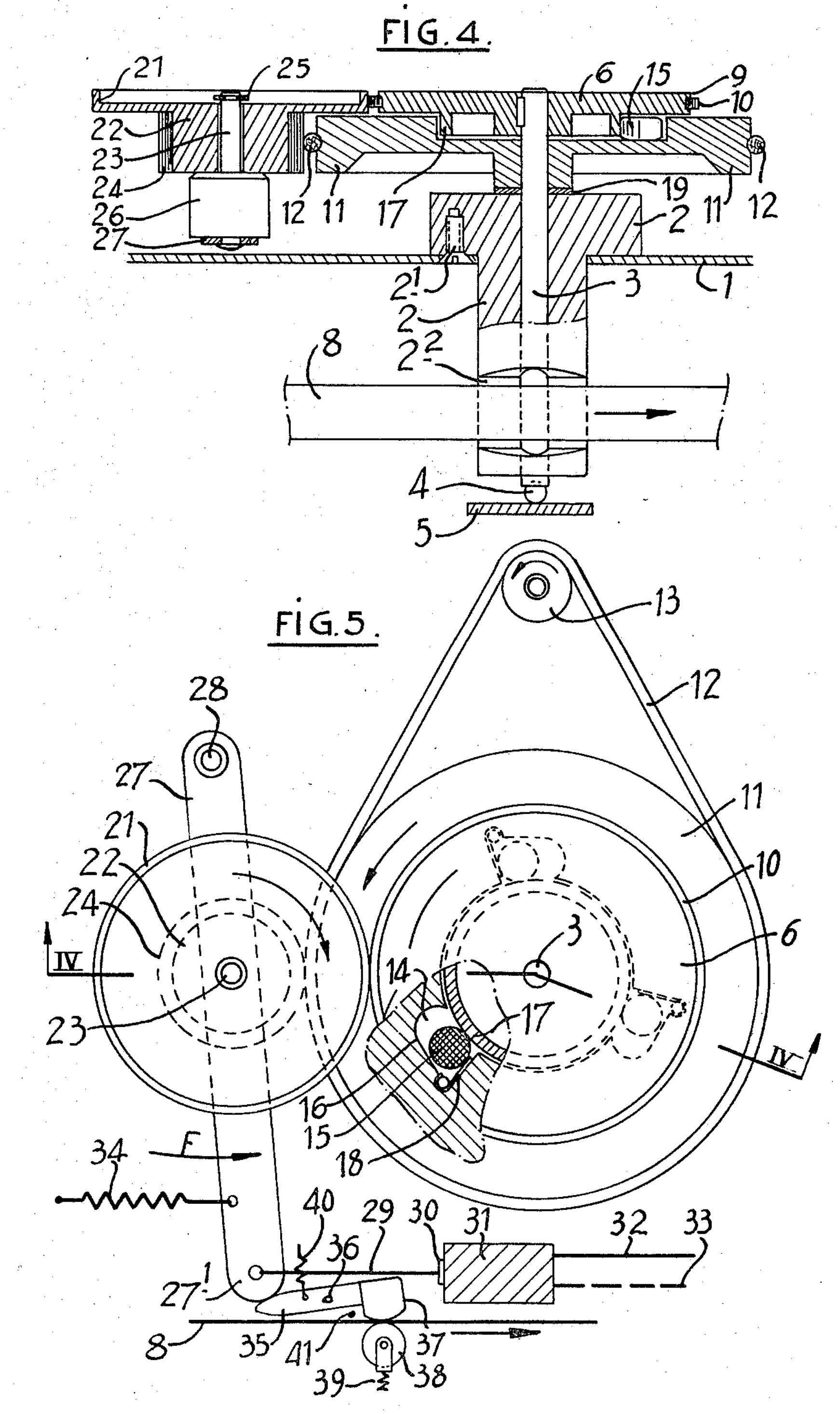
Figure 6:
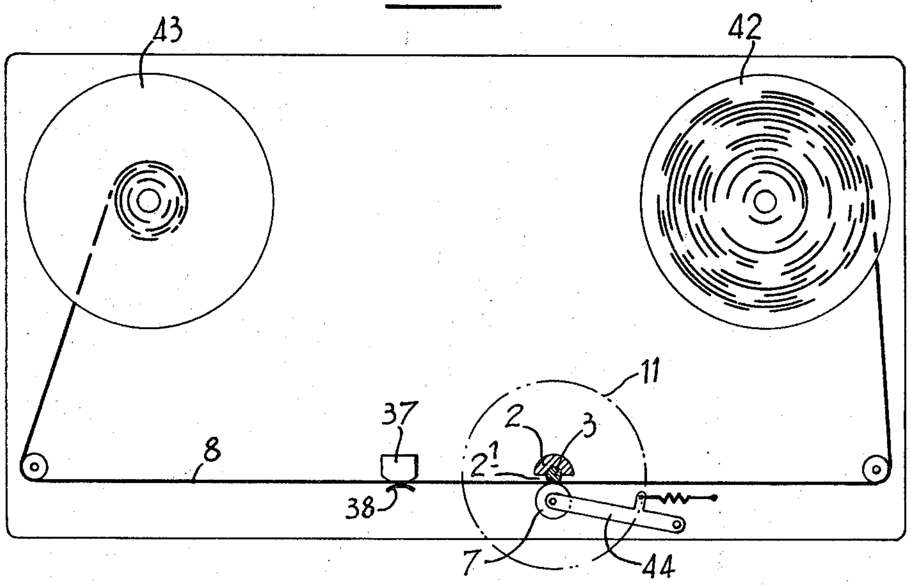
Figure 7:
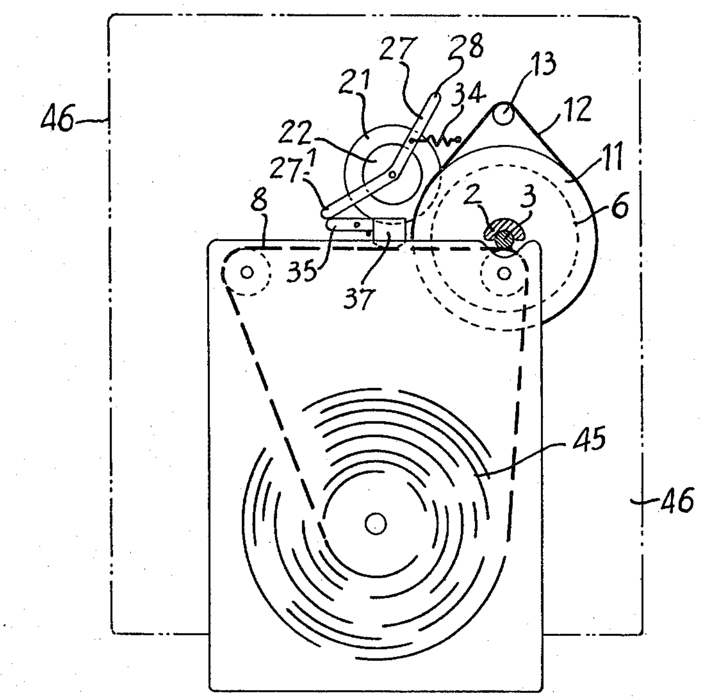

FIGS. 4 and 5 are views corresponding to FIGS. 1 and 2, of the apparatus during movement to a different part of the tape, and FIGS. 6 and 7 illustrate an alternative embodiment of the invention in a magnetic tape recording and playback apparatus with an endless cassetted tape.

The apparatus capstan in FIGS. 1 to 5 comprises a fixed plate 1 forming part of a frame to which there is attached by screws $2^1$ a bearing 2 in which is rotatably mounted a capstan 3 which rests at its bottom end on a ball 4 resting on a member 5 which also forms part of the frame, the capstan 3 having fixed at its top end a coaxial driving wheel 6.

The bearing 2 is formed with recess $2^2$ (FIG. 3) for the passage of a tape 8 urged against the capstan 3 by a pressure roller 7 borne by a lever (not shown in FIG. 3).

The periphery of the wheel 6 is formed with a recess 9 receiving a rubber ring 10, and a flywheel 11 is mounted freely on the capstan beneath the pulley 6 the flywheel 11 being driven by a belt 12 driven by a drive pulley 13 keyed to the shaft of a motor (not shown). The upper surface of the flywheel 11 is formed with three recesses 14, each of which accommodates a cylindrical roller 15. Each recess 14 is defined by two opposing surfaces one of which comprises a toothed ring extending from the underside of the wheel 6 and the other of which comprises a ramp 16 on the flywheel, said surfaces diverging in the direction of rotation of the flywheel as shown by the arrows. Each roller 15 is urged by a spring 18 in the converging direction of said surfaces. Thus, in the position shown in FIGS. 1 and 2 in which the capstan is driven directly by the flywheel and the tape presents a drag on the capstan, the rollers 15 are wedged between the ramps 16 and the toothed ring 17, while in the position shown in FIGS. 3 and 4 in which the capstan is rotated at a higher speed than the capstan, the rollers are urged into wider parts of the gaps allowing relative movement of the flywheel and capstan. The rollers thus constitute a one-way clutch between the flywheel and the driving wheel and hence the capstan.

The rollers 15, which form locking elements, can be replaced by a pawl and ratchet clutch arrangement or strip and ratchet clutch arrangement in other embodiments. A washer 19 (FIG. 1) is interposed between the hub 20 of the flywheel 11 and the upper portion of the bearing 2.

A stepped pulley 21, 22 is mounted freely on a shaft 23 extending through a base 26 and fixed to one end of a lever 27 which can pivot around a pivot 28. The pulley 21, 22 is retained on the shaft by a retaining washer 25 at the upper end thereof. The pulley has a step 21 of major diameter and a step 22 of smaller diameter, the difference in the diameters of the steps being equal to the difference in the diameters of the drive wheel 6 and the flywheel 11. The step 22 has its circumference provided with a toothed rubber ring 24, while the rim of the step 21 is smooth. Attached to the other end of the lever 27 is a cable 29, a rod or other like element connected to the armature 30 of an electromagnet 31 energized through wires 32, 33. When the electromagnet is not energized the lever 27 is retained in the position shown in FIGS. 1 and 2, in which the pulley 21, 22 is out of engagement with the driving wheel 6 and the flywheel 7, by a tension spring 34. When the electromagnet is energized, a pull is exerted on the cable 29 and the lever 27, is pivoted in the direction indicated by arrow F (FIG. 5) so that the toothed ring 24 contacts the belt 12 and the step 21 contacts the ring 10 of the pulley 6. At the same time the end $27^1$ (FIG. 5) of the lever 27 engages one end of a lever 35 pivoted to the frame and carrying at its other end a playback head 37 cooperating with a magnetic tape 8 urged against the playback head by a pressure roller 38 loaded by springs 39. Engagement of the lever 27 with the lever 35 pivots the lever 35 to reduce the pressure of the playback head 37 on the tape. The solenoid can be controlled electrically as described above or alternatively can be controlled electronically. The lever 35 is urged against the roller 38 by a spring 40 and a stop 41 is provided to limit movement of the lever 35.

The apparatus operates as follows:

During normal recording or playback the electromagnet 31 is deenergized and the apparatus is in the position shown in FIG. 1 in which the flywheel 11 is driven by the belt 12 and the capstan 3 is driven through the driving wheel 6, and the rollers 15 by the flywheel to move the tape past the head 37 at a uniform speed, the inertia of the flywheel minimizing variations in the speed of the capstan.

When it is desired to move to a different location in the tape, the electromagnet 31 is energized so that the lever 27 and the pulley 21,22 are moved to the position shown in FIGS. 4 and 5. The driving wheel is now driven through the pulley 21, 22 from the flywheel 11 so that the capstan rotates at a much higher speed than before. The coupling between the flywheel and the driving wheel through the rollers 15 is therefore disconnected so that the inertia of the flywheel 16 does not reduce the acceleration which can be imparted to the capstan.

FIG. 6 shows the general layout of the apparatus in one embodiment in which magnetic tape 8 is unwound from a spool 42 and wound onto another spool 43. The pressure wheel 7 is attached to a spring biased lever 44.

FIG. 7 shows the general layout of another embodiment of the apparatus in which an endless loop of tape 8 is carried in a cassette on a spool, the arrangement allowing the tape to be rewound on the spool as it is removed therefrom to pass through the apparatus.

I claim:

1. A magnetic recording and playback apparatus comprising:
   1. a supporting frame;
   2. a capstan rotatably mounted in the frame for engaging a magnetic tape and driving the same through the apparatus;
   3. first driving means connectable to and disconnectable from the capstan for driving the capstan at high speed;
   4. a flywheel mounted in the frame for rotation about the same axis as the capstan;

5. second driving means for driving the flywheel at a relatively low speed; and
6. clutch means between the capstan and the flywheel to connect the capstan with the flywheel when said first driving means is disconnected from the capstan and to disconnect the flywheel from the capstan when said first driving means is connected to the capstan.

2. The apparatus of claim 1 in which said clutch means comprises one or more rollers each disposed in a gap between opposed surfaces on said flywheel and a member fixed to said capstan, said surfaces diverging in the direction of rotation of the capstan and the flywheel so that the roller is jammed between said opposed surfaces when said first driving means is disconnected from the capstan to connect the capstan and the flywheel.

3. The apparatus of claim 1 in which said first driving means comprises a driving wheel fixed with respect to said capstan, coaxial therewith and of a diameter less than said flywheel, and a pulley having two steps of diameters whose difference is equal to the difference of the diameters of said driving wheel and said flywheel, means being provided for moving the pulley between a position in which it is out of engagement from the capstan and driving wheel and a position in which the step of smaller diameter is in engagement with means around the rim of the flywheel and the step of larger diameter is in engagement with the rim of said driving wheel.

4. The apparatus of claim 3 in which said means for moving said pulley comprises an electromagnet having an armature and means connecting the armature of the electromagnet with the pulley.

5. The apparatus of claim 3 which includes a playback head to engage tape passing through the apparatus and means connecting the playback head with said pulley to reduce the pressure of the playback head on the tape when the pulley is moved into engagement with said flywheel and said driving wheel.

6. The apparatus of claim 3 wherein said second driving means comprises a driving belt extending around the rim of said flywheel and constituting said means around the rim of the flywheel, and said step of said pulley of smaller diameter is toothed to engage the driving belt where the latter engages the flywheel.

7. The apparatus of claim 4 comprising a lever on which said pulley is mounted for rotation, said lever being pivoted to said frame, said means connecting the armature of the electromagnet with the pulley comprising a member connected to said lever and the armature.

8. The apparatus of claim 7 comprising a further lever, a playback head mounted on said further lever, said further lever being pivoted with respect to said frame and arranged to engage a tape passing through the apparatus with a pressure which varies according to the position of said further lever, and cam means on said lever carrying said pulley for engaging said further lever when the pulley is moved into engagement with said flywheel and said drive wheel, to pivot said further layer and reduce the pressure of the playback head on the tape.